(12) United States Patent
Itoga (10) Patent No.: US 7,815,218 B2
(45) Date of Patent: Oct. 19, 2010

(54) VEHICLE-OCCUPANT RESTRAINT SYSTEM

(75) Inventor: Yasuo Itoga, Tokyo (JP)

(73) Assignee: Takata Corporation, Tokyo (JP)

( * ) Notice: Subject to any disclaimer, the term of this patent is extended or adjusted under 35 U.S.C. 154(b) by 214 days.

(21) Appl. No.: 12/086,080

(22) PCT Filed: Oct. 27, 2006

(86) PCT No.: PCT/JP2006/321484

§ 371 (c)(1),
(2), (4) Date: Jun. 5, 2008

(87) PCT Pub. No.: WO2007/069396

PCT Pub. Date: Jun. 21, 2007

(65) Prior Publication Data

US 2009/0184503 A1   Jul. 23, 2009

(30) Foreign Application Priority Data

Dec. 16, 2005   (JP) .............................. 2005-363690

(51) Int. Cl.
*B60R 21/18* (2006.01)
(52) U.S. Cl. ..................................... 280/733
(58) Field of Classification Search ................. 280/733; B60R 21/18
See application file for complete search history.

(56) References Cited

U.S. PATENT DOCUMENTS

| | | | | |
|---|---|---|---|---|
| 3,820,842 A | * | 6/1974 | Stephenson | 280/733 |
| 3,848,887 A | * | 11/1974 | Fox | 280/733 |
| 3,866,940 A | * | 2/1975 | Lewis | 280/733 |
| 3,888,503 A | * | 6/1975 | Hamilton | 280/733 |
| 3,970,329 A | * | 7/1976 | Lewis | 280/733 |
| 5,472,231 A | * | 12/1995 | France | 280/733 |
| 5,642,902 A | * | 7/1997 | France | 280/737 |
| 5,947,513 A | * | 9/1999 | Lehto | 280/733 |
| 6,276,715 B1 | * | 8/2001 | Takeuchi | 280/733 |
| 6,286,860 B1 | * | 9/2001 | Adomeit et al. | 280/733 |
| 2005/0189749 A1 | * | 9/2005 | Itaoga et al. | 280/733 |

(Continued)

FOREIGN PATENT DOCUMENTS

JP    S57-203944 U    12/1982

(Continued)

*Primary Examiner*—Paul N. Dickson
*Assistant Examiner*—Joselynn Y. Sliteris
(74) *Attorney, Agent, or Firm*—Manabu Kanesaka (57) ABSTRACT

A vehicle-occupant restraint system 20 is provided in that gas of an inflator is introduced into a lap belt inflatable part from an end of the lap belt, and the installation of the end of the lap belt and the inflator to a vehicle side member is simplified. The vehicle-occupant restraint system 20 includes webbing 21 routed along the front of an occupant sitting on a seat 10, an inflatable lap bag 22 constituting the front end portion of a lap belt portion of the webbing 21, an inflator 23 for inflating the lap bag 22, an anchor 24 for attaching the front end of the lap bag 22 to the vehicle side member, and a retractor 25 for retracting the rear end of the webbing 21. The front end of the lap bag 22 is attached to a B pillar 30 serving as the vehicle side member via the anchor 24, so that the installation of the lap belt onto the vehicle side member is simplified, reducing cost.

6 Claims, 9 Drawing Sheets

U.S. PATENT DOCUMENTS

2007/0063493 A1 * 3/2007 Higuchi et al. .............. 280/733

FOREIGN PATENT DOCUMENTS

| | | |
|---|---|---|
| JP | S59-124544 U | 8/1984 |
| JP | S59-125454 U | 8/1984 |
| JP | S59-127651 U | 8/1984 |
| JP | S59-127652 U | 8/1984 |
| JP | H01-29159 Y2 | 9/1989 |
| JP | H11-165604 A | 6/1999 |
| JP | H11-170949 A | 6/1999 |
| JP | H11-170950 A | 6/1999 |
| JP | H11-268608 A | 10/1999 |
| JP | H11-268609 A | 10/1999 |
| JP | 2002-145002 A | 5/2002 |
| JP | 2003-312439 A | 11/2003 |
| JP | 2004-042694 | 2/2004 |
| JP | 2004-351948 | 12/2004 |
| JP | 2005-512588 A | 5/2005 |
| JP | 2005-231504 | 9/2005 |
| JP | 2005-239055 | 9/2005 |
| WO | WO 97/47498 | 12/1997 |
| WO | WO 01/36235 | 5/2001 |

* cited by examiner

Fig. 8b

VEHICLE-OCCUPANT RESTRAINT SYSTEM

TECHNICAL FIELD

The present invention relates to a vehicle-occupant restraint system including an air-belt (or a seatbelt having an airbag) inflatable when a vehicle collision occurs.

BACKGROUND ART

A structure is described in FIG. 2 of WO01/036235, in which a retractor is arranged on a vehicle floor and the end of an inflatable lap belt is retracted around the retractor. In this conventional example, an inflator is arranged on the vehicle floor and gas is introduced to the lap belt via a special structure called a plenum.

[Patent Document 1] WO01/036235

In the above-mentioned WO01/036235, the special member called the plenum is used so as to have a complicated structure and high cost. The plenum is also bulky and the degree of freedom in arrangement is low.

DISCLOSURE OF INVENTION

It is an object of the present invention to provide a vehicle-occupant restraint system, in which a gas in an inflator is to be introduced into an inflatable part of a lap belt from an end of the lap belt, capable of simplifying the attaching the end of the lap belt and the inflator to a vehicle body side member.

A vehicle-occupant restraint system according to the present invention includes an air belt including a lap belt; an inflatable part provided at least part of the lap belt; an inflator configured to generate gas for inflating the inflatable part; and a flow path configured to introduce the gas from the inflator to the inflatable part via an end of the lap belt, wherein the end of the lap belt and the inflator are attached via an anchor to at least one of a B pillar and a vehicle chamber floor of a vehicle body.

In the vehicle-occupant restraint system according to a first aspect having the air belt including the inflatable part to be introduced by gas from the end of the lap belt and the inflator for inflating the inflatable part, the end of the lap belt and the inflator are attached to the B pillar via the anchor.

According to the first aspect, the inflator may also be fixed to the anchor, which in turn is fixed to the B pillar.

In the vehicle-occupant restraint system according to a second aspect having the air belt including the inflatable part to be introduced by gas from the end of the lap belt and the inflator for inflating the inflatable part, the end of the lap belt and the inflator are attached to the vehicle chamber floor via the anchor.

According to the second aspect, the inflator may also be fixed to the anchor, which in turn is fixed on the vehicle chamber floor.

According to the first and second aspects, the anchor and the inflator may also be covered with a cover.

In the vehicle-occupant restraint system according to the present invention, gas from the inflator is to be introduced into the inflatable part of the lap belt from the end of the lap belt. The end of the lap belt and the inflator are attached via the anchor to the B pillar (the first aspect) or the vehicle chamber floor (the second aspect), so that the installation to the B pillar or the vehicle chamber floor is easy.

In the vehicle-occupant restraint system according to the present invention, when a vehicle collision (including a side impact according to the present invention, or may also include a lateral turning) is detected or foreknown by a collision detection sensor or a collision foreknowing sensor provided in the vehicle, on the basis of the detection signal or the foreknown signal from the sensor, the inflator is started for discharging gas. The gas from the inflator is introduced into the inflatable part, so that the inflatable part is inflated. Thereby, an occupant is restrained on the seat while an impact applied to the occupant is being absorbed by the inflated inflatable part.

By fixing the inflator to the anchor and then, the anchor is attached to the B pillar or on the vehicle chamber floor, the installation of the inflator to the B pillar or on the vehicle chamber floor is simplified.

When the anchor and the inflator are attached to the B pillar or on the vehicle chamber floor and are covered with a cover, the appearance is also improved.

DETAILED DESCRIPTION

Figure 1:
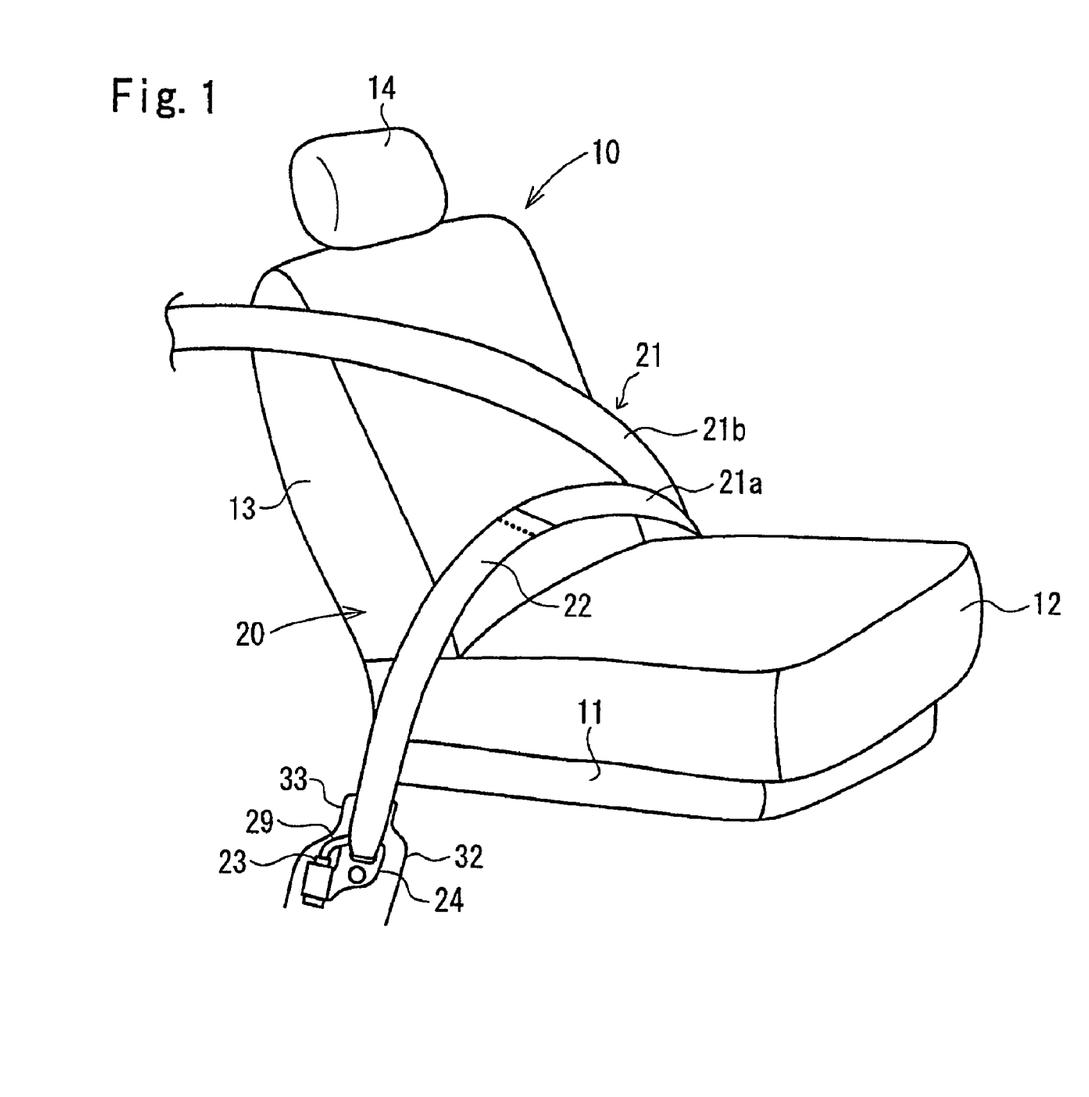
FIG. 1 is a perspective view of a vehicle seat having a vehicle-occupant restraint system according to an embodiment.
Figure 2:
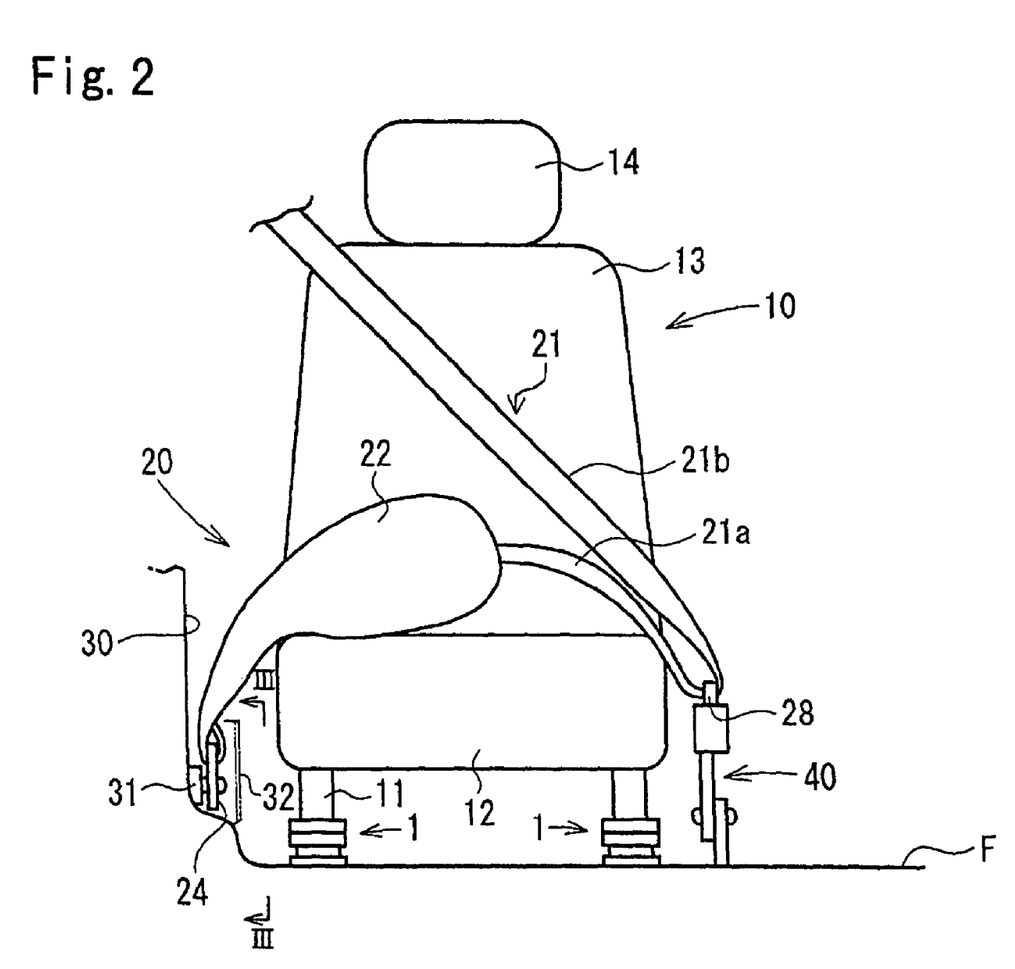
FIG. 2 is a front view of the vehicle seat of FIG. 1.
Figure 8A:
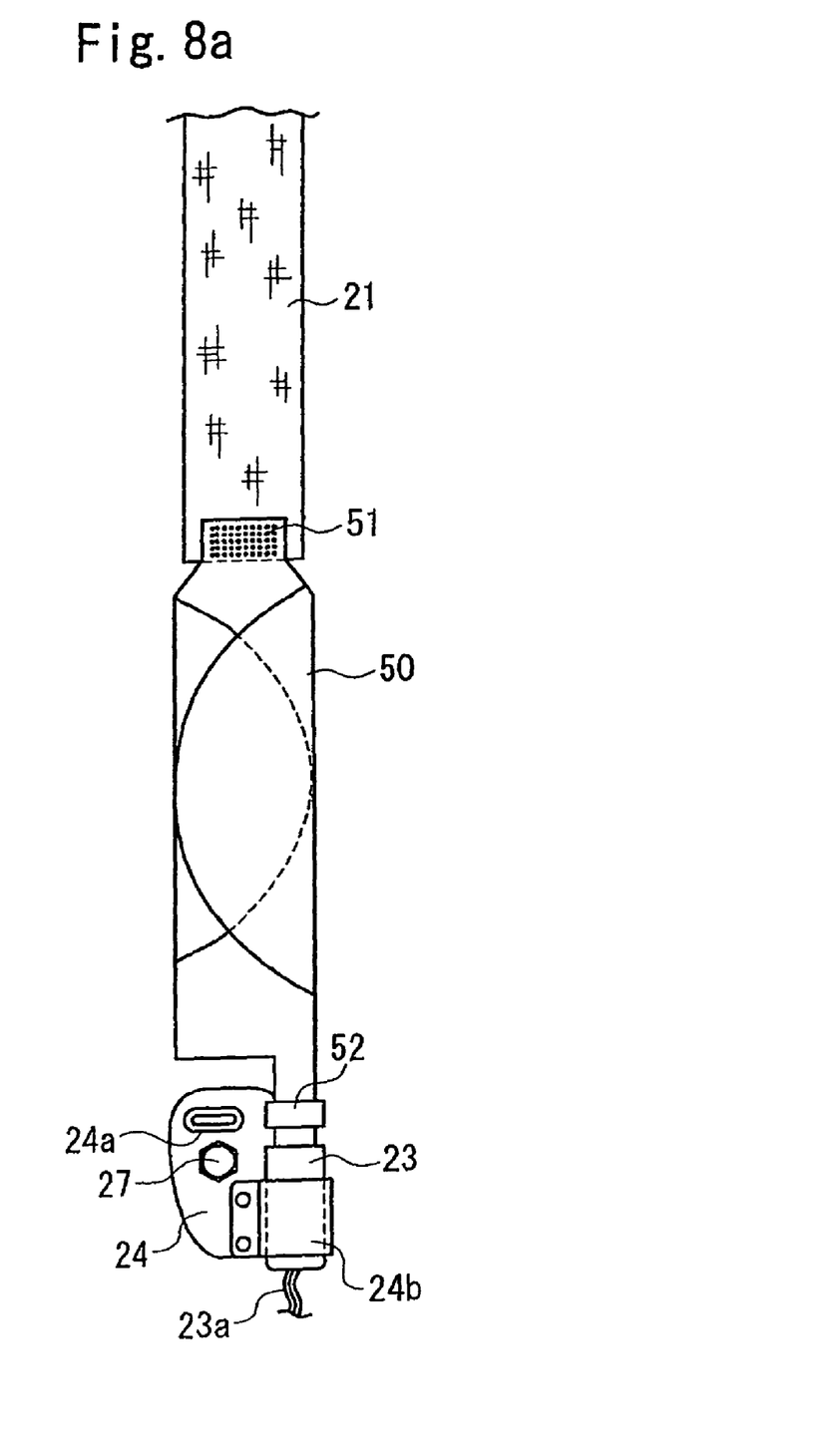
FIG. 8a is an explanatory view illustrating the internal structure of the lap bag during the non-inflation.
Figure 8B:
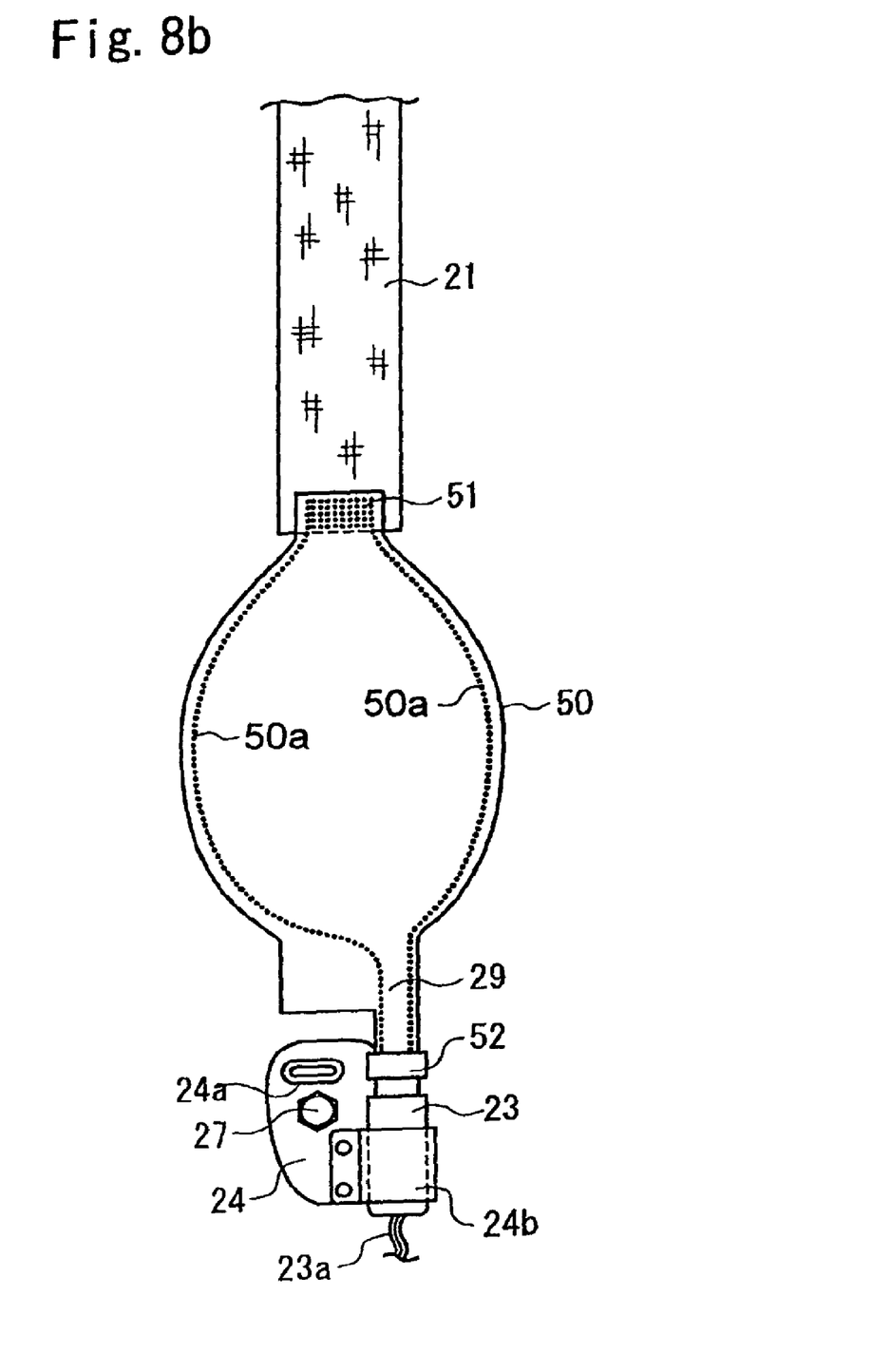
FIG. 8b is an explanatory view illustrating the internal structure of the lap bag during the inflation.

Embodiments of the present invention will be described below with reference to FIGS. 1 to 8a. FIGS. 2 and 6b show the inflated state of a lap bag of an air belt while the other figures show the state before inflation. FIG. 8a shows a bag body of the lap bag folded in a narrow strip; FIG. 8b shows the bag body extended flatly.

On a vehicle chamber floor F, a pair of seat rails 1 are extended in parallel in the front-back direction of a vehicle, on which a vehicle seat 10 is arranged movably in the front-back direction of the vehicle.

The seat 10 includes a seat frame 11, a seat cushion 12 placed on the seat frame 11, a seat back 13 arranged to stand from the rear of the seat cushion 12 and to be capable of reclining, and a head rest 14 attached on the top of the seat back 13.

A vehicle-occupant restraint system 20 includes webbing 21 routed along the front of an occupant sitting on the seat 10, an inflatable lap bag 22 constituting the end portion of a lap belt portion 21a (below-mentioned) of the webbing 21, an inflator 23 for inflating the lap bag 22, an anchor 24 for attaching the end of the lap bag 22 to a vehicle side member, and a retractor 25 (FIG. 5) for retracting the rear end of the webbing 21.

The webbing 21 is made of a normal non-inflatable belt material. The rear end of the webbing 21 is connected to the seat belt retractor 25 retractably therearound after being hooked through a shoulder anchor 29 arranged in an upper side portion of a vehicle chamber. An intermediate portion of the webbing 21 is hooked through a tong 28 (FIG. 2).

Along the webbing 21, the side toward the anchor 24 from the tong 28 becomes the lap belt portion 21a that is routed along front faces of the lower back and the abdominal part of an occupant sitting on the seat 10, while the side toward the shoulder anchor 29 from the tong 28 becomes a shoulder belt portion 21b that is routed along the front face of the upper body of the occupant.

The rear end (upper ends of FIGS. 3 to 5) of the lap bag 22 is connected to the end of the webbing 21 of the lap belt portion 21a with stitching.

Figure 4:
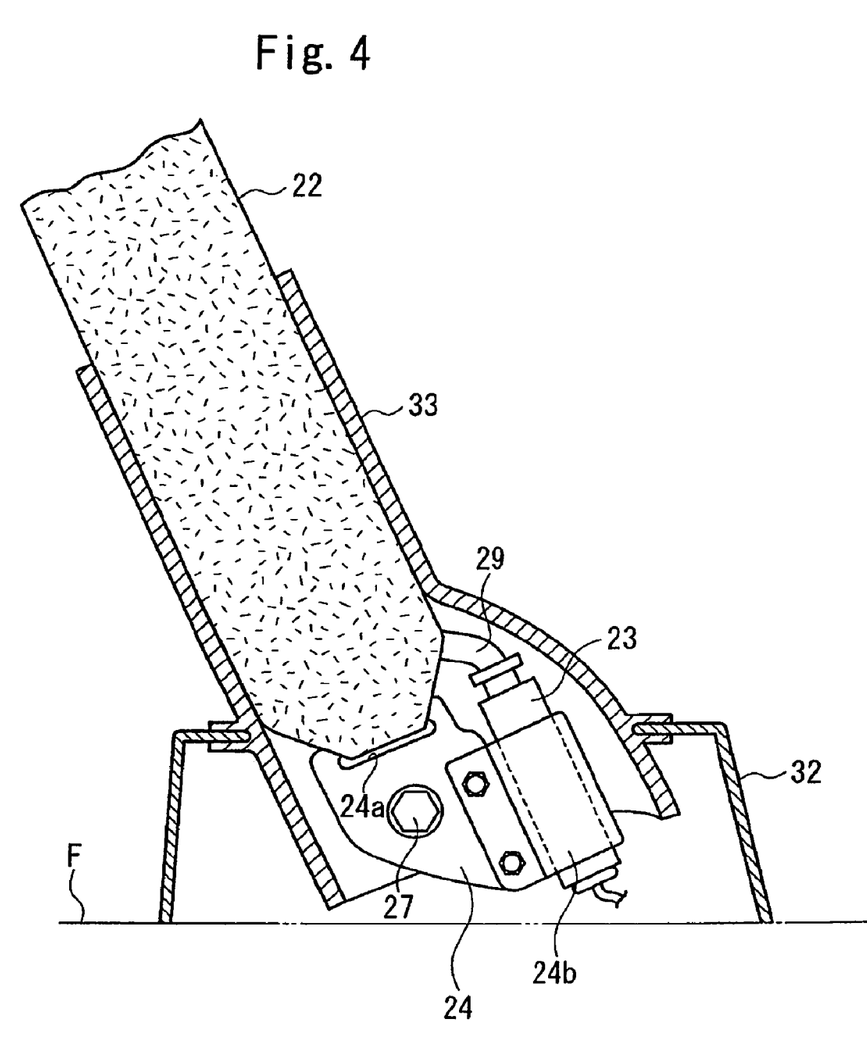
FIG. 4 is a sectional view at the line IV-IV of FIG. 5.
Figure 5:
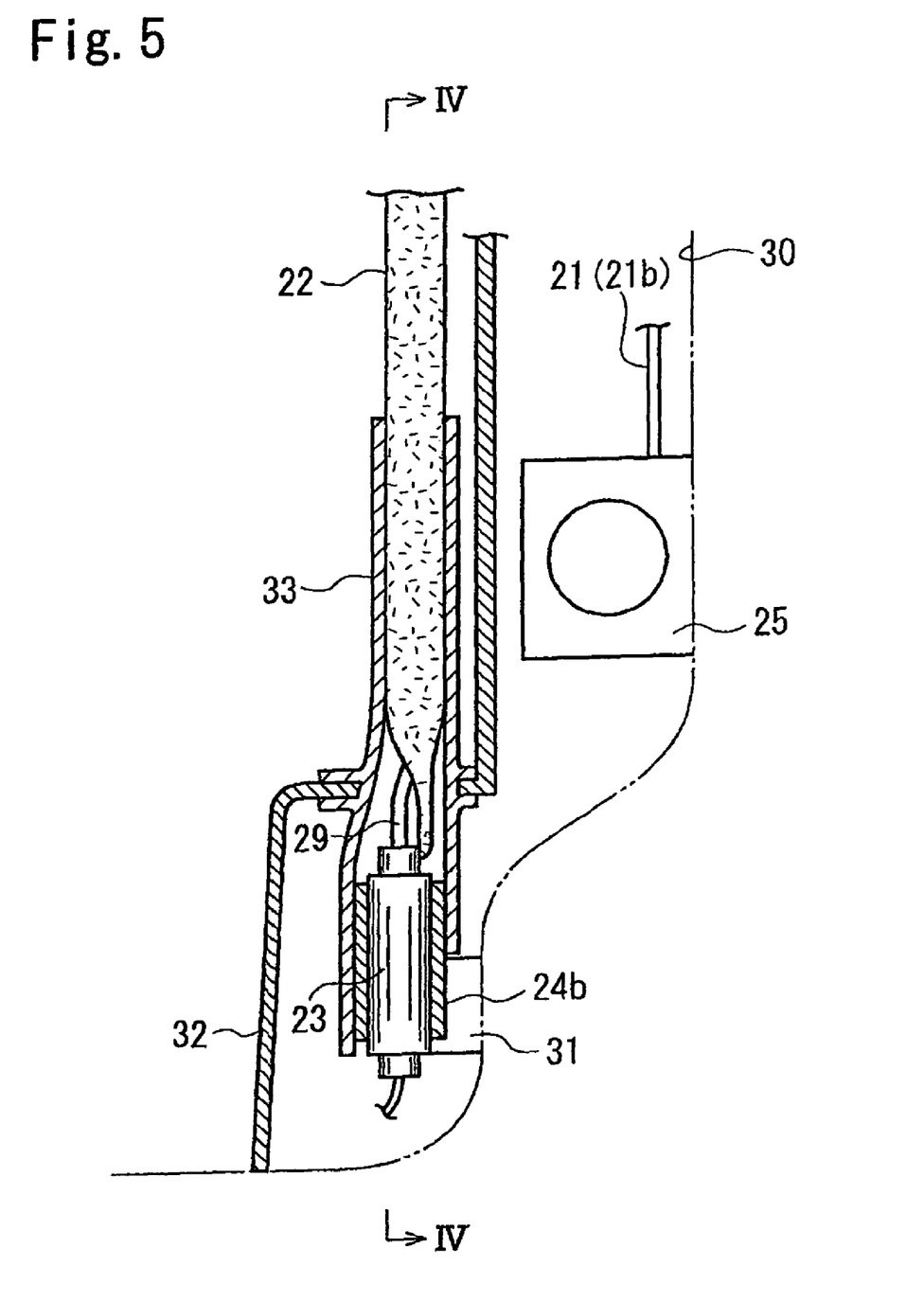
FIG. 5 is a sectional view at the line V-V of FIG. 3.

The end of the lap bag 22, as shown in FIG. 4, is inserted into an opening 24a of the anchor 24 and sewn therein, so that the lap bag 22 is connected to the anchor 24.

The lap bag 22 includes a bag body 50, mesh webbing (not shown) surrounding the bag body 50, and a protection cover (not shown) covering the substantial whole mesh webbing and the end portion of the webbing 21.

The bag body 50 is made by overlapping a plurality of pieces of base cloth with the periphery stitched by a seam 50a to have a bag. The rear end of the bag body 50 is sewn to the end of the webbing 21 into a seam 51. As shown in FIG. 8b, the maximum width of the base cloth is larger than the width of the webbing 21. The bag body 50, as shown in FIG. 8a, is made in a strip shape with the substantial same width as that of the webbing 21 by folding back both lateral sides. From the front end of the lap belt portion 21a of the bag body 50, a gas introducing duct 29 is extended.

The mesh webbing covers the folded strip-shaped bag body 50. The mesh webbing is made of knitted fabric that can scarcely elongate in the longitudinal direction while can elongate flexibly in width and expanding directions.

The rear end of the mesh webbing is stitched to the vicinity of the end of the webbing 21. The front end of the mesh webbing is connected to the anchor 24 by inserting the front end into the opening 24a of the anchor 24 and folding back it for stitching it at the rear side further than the front end.

The protection cover is made by folding back a narrow rectangular sheet material and by sewing it along a tear seam (not shown) to have a cylindrical shape. The tear seam has a strength to the extent of breaking off when the bag body 50 is inflated.

The protection cover extends from the end of the webbing 21 toward the nearest position to the anchor 24. The rear end of the protection cover covers the stitched portion between the webbing 21 and the mesh webbing, and is sewn to the webbing 21 along the tear seam. The front end of the protection cover covers the front end seam of the mesh webbing; however, it is slightly separated from the anchor 24. The front end of the protection cover is stitched to the mesh webbing along the tear seam. Both the tear seams adjacent to the rear end and the front end of the protection cover have a strength to the extent of breaking off when the bag body 50 is inflated.

According to the embodiment, the anchor 24 is provided with an inflator holder 24b, so that the inflator 23 is supported to the anchor 24 by being embraced around the inflator holder 24b.

To the inflator 23, the gas introducing duct 29 is connected. According to the embodiment, the gas introducing duct 29 is fitted outside the gas nozzle of the inflator 23, and by tightening a band 52 (FIGS. 8a and 8b) around the gas introducing duct 29 from the outside, the gas introducing duct 29 is connected to the inflator 23. Gas is introduced from the inflator 23 into the bag body 50 of the lap bag 22 via the gas introducing duct 29.

A harness 23a (FIGS. 8a and 8b) is connected to an inflator control circuit (not shown) for turning on electricity to an initiator (not shown) of the inflator 23. On the basis of a seizing signal from the inflator control circuit, the initiator is started so that the inflator 23 discharges the gas.

As shown in FIGS. 4 to 6b, the anchor 24 is attached to an anchor-attaching pedestal base 31 disposed in the lower part of the B pillar 30 with a clamp bolt 27. The anchor 24, the inflator 23, and the lower part of the B pillar are covered with a B pillar cover 32. The lower portion of the lap bag 22 upwardly extended from the B pillar cover 32 is embraced around a belt cover 33.

Figure 3:
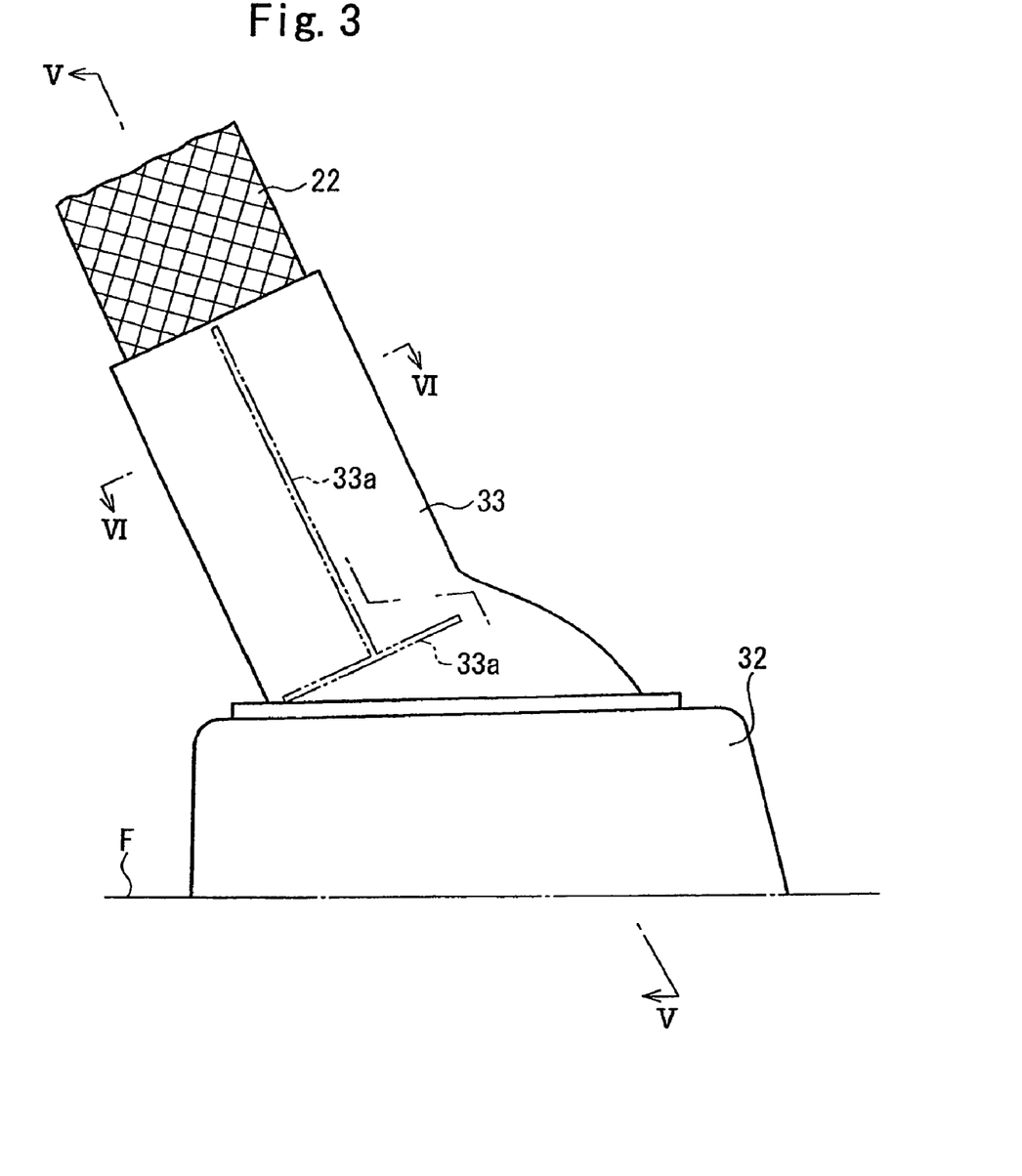
FIG. 3 is a drawing viewed in arrow direction of FIG. 2 during the non-inflation of a lap bag.
Figure 6A:
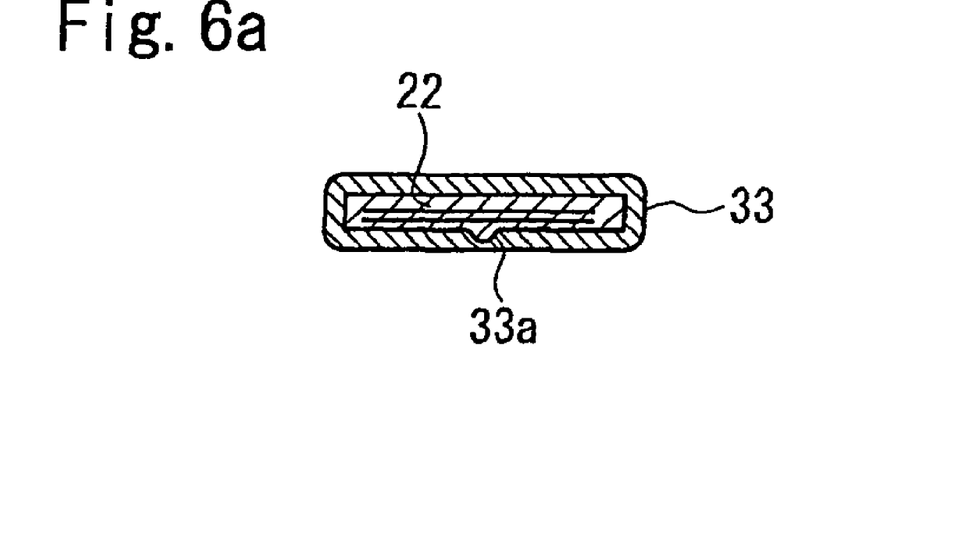
FIG. 6a is a sectional view at the line VI-VI of FIG. 3 during the non-inflation of a lap belt.
Figure 6B:
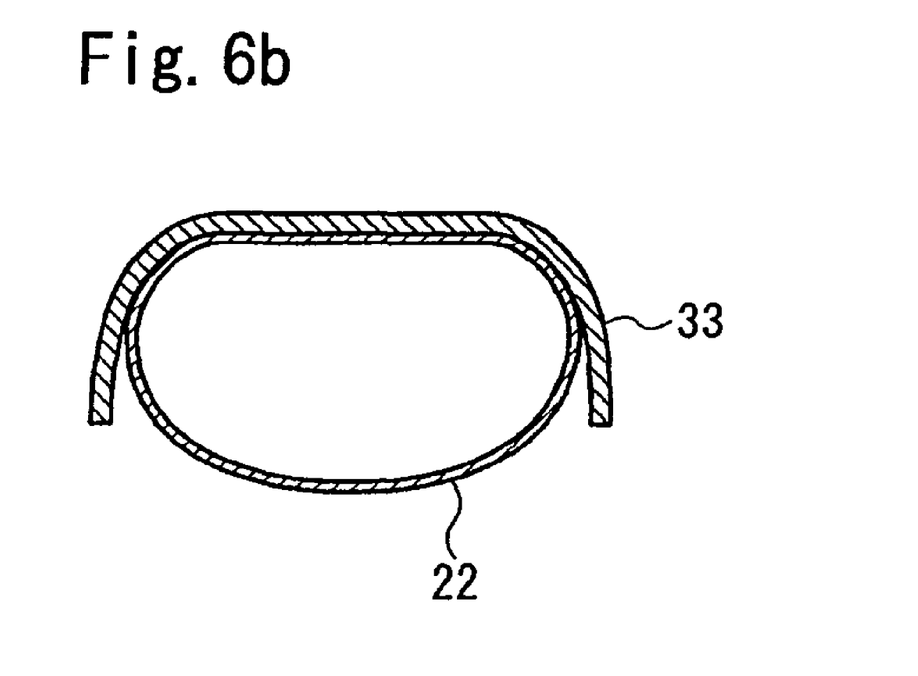
FIG. 6b is a sectional view at the line VI-VI of FIG. 3 during the inflation of the lap belt.
Figure 7:
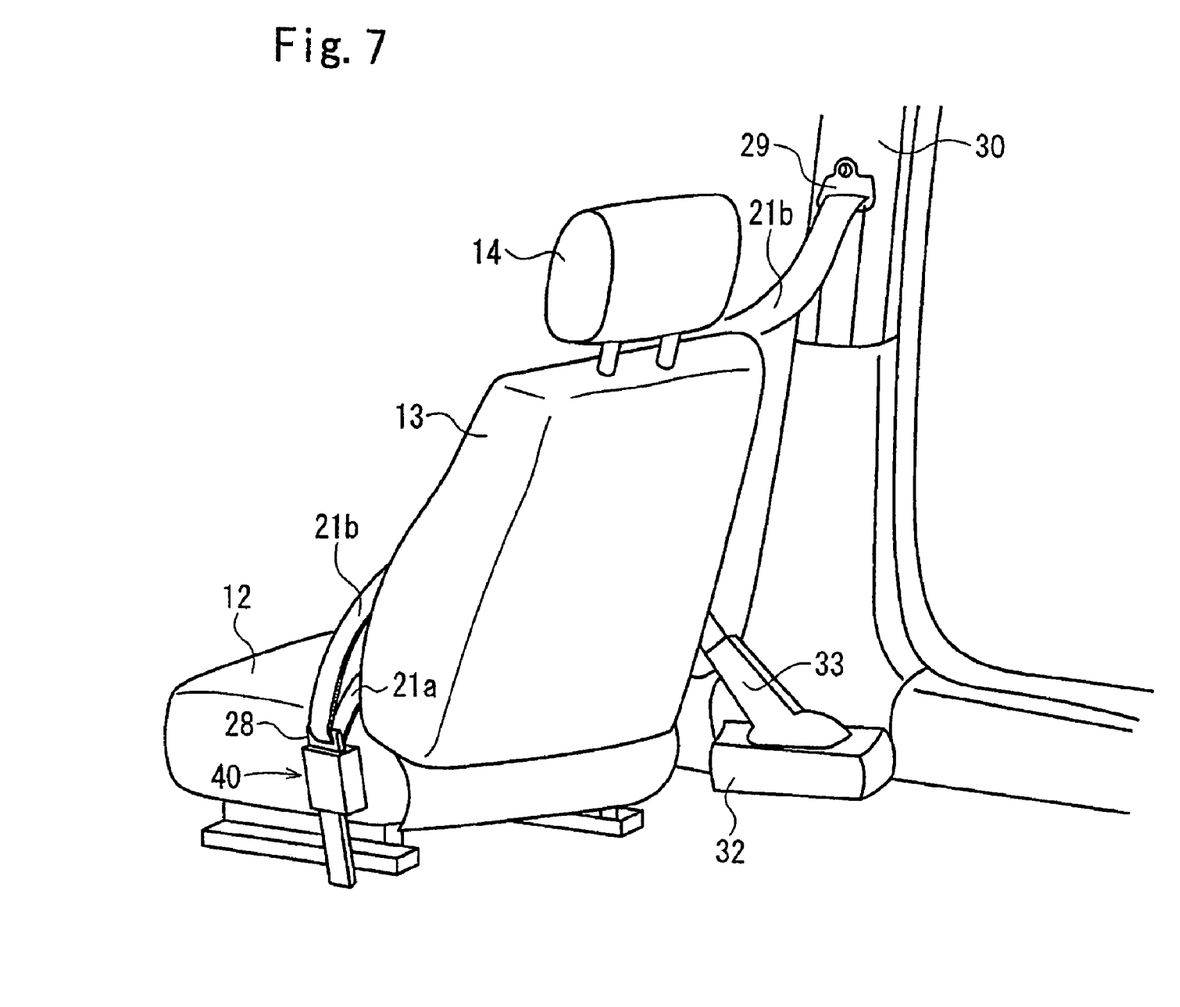
FIG. 7 is a perspective view of the vicinity of the vehicle seat of FIG. 1 viewed from the rear.

As shown in FIGS. 3 and 6, the belt cover 33 is provided with tear lines 33a formed thereon, and when the lap bag 22 is inflated, the lap bag 22, as shown from FIG. 6a to FIG. 6b, is cleft along the tear lines 33a.

As shown in FIG. 2, on the side of the seat 10 adjacent to the chamber center, a buckle device 40 is provided for latching the tong 28. The buckle device 40 may be attached to the seat 10 or may also be arranged on the vehicle chamber floor F.

Although not shown, various sensors are provided on a vehicle having the vehicle-occupant restraint system 20 mounted thereon for detecting a collision (including a side impact, it is the same in the below) of the vehicle or for foreknowing a collision or a lateral turning of the vehicle (both the detection sensor and the foreknowing sensor may also be provided). The inflator control circuit starts the initiator of the inflator 23 based on the detection or foreknown signal from these sensors.

In the vehicle-occupant restraint system configured in such a manner, the end of the lap bag 22 is attached to the B pillar 30 serving as a vehicle side member via the anchor 24, so that the installation of the lap belt onto the vehicle side member is simplified, reducing cost.

According to the embodiment, the inflator 23 is integrated with the anchor 24, so that the inflator 23 can also be easily attached to the B pillar 30.

The anchor 24 and the inflator 23 are also covered with the B pillar cover 32, improving also the appearance.

The operation of the vehicle-occupant restraint system is as follows.

When a collision or a lateral turning of the vehicle is detected or foreknown by the sensor, on the basis of the detection signal or the foreknown signal, a seizing signal from the inflator control circuit is entered in the initiator of the inflator 23 so as to start the initiator for discharging gas from the inflator 23. The gas from the inflator 23 is introduced into the lap bag 22 (into the bag body 50) via the duct 29, so that the lap bag 22 (the bag body 50) is inflated while cleaving the belt cover 33 and the protection cover (not shown).

At this time, along with the inflation of the bag body 50 of the lap bag 22, the mesh webbing surrounding the bag body 50 is also inflated; since the mesh webbing is knitted so that it is scarcely elongated in the longitudinal direction while can elongate flexibly in width and expanding directions, when the mesh webbing is inflated, its length is shortened. Thereby, tension is applied to the webbing 21, so that the lap belt portion 21a (including the lap bag 22) is brought into tight contact with the body of an occupant so as to securely restrain the occupant to the seat 10 while the impact applied to the lower back or the abdominal part of the occupant is absorbed by the inflated lap bag 22.

The embodiment described above shows an example of the present invention, so that the invention is not limited to the embodiment.

According to the embodiment, the anchor 24 is attached to the lower portion of the B pillar 30; alternatively, it may be arranged on the vehicle chamber floor F.

According to the embodiment, the vehicle-occupant restraint system for a driver's seat is exemplified; the present invention can be obviously incorporated in other seats such as a passenger's seat.

The present invention has been described in detail with a specific embodiment; however, it is apparent to one skilled in the art that various modifications can be made without departing from the spirit and scope of the present invention.

This application is made based on Japanese Patent Application filed on 16$^{th}$ day of Dec., 2005 (Japanese Patent Application No. 2005-363690) and its whole application can be incorporated by reference.

The invention claimed is:

1. A vehicle-occupant restraint system comprising:
   a webbing including a lap portion;
   an inflatable lap bag having a first end fixed to an end of the lap portion and a second end, said lap bag and the lap portion forming a lap belt;
   an inflator configured to generate gas for inflating the lap bag;
   a gas introducing duct attached to the inflator, said gas introducing duct forming a flow path configured to introduce the gas from the inflator to the lap bag; and
   an anchor adapted to be attached to at least one of a B pillar and a vehicle chamber floor of a vehicle body, said second end of the lap bag being directly fixed to the anchor and said inflator being fixed to the anchor through an inflator holder.

2. The system according to claim 1, wherein the second end of the lap bag and the inflator are attached to the B pillar via the anchor.

3. The system according to claim 2, wherein the inflator is fixed to the anchor, which in turn is fixed to the B pillar.

4. The system according to claim 1, wherein the anchor and the inflator are covered with a cover.

5. The system according to claim 1, wherein said lap bag comprises a bag body formed by a plurality of base cloths stitched along a periphery thereof to form a bag.

6. The system according to claim 5, wherein said lap bag is arranged such that the bag body is folded to have a strip shape.

\* \* \* \* \*